US012652419B2

(12) United States Patent
Kim et al.

(10) Patent No.: US 12,652,419 B2
(45) Date of Patent: Jun. 9, 2026

(54) APPARATUS AND METHOD FOR IMAGE ENCODING AND DECODING

(71) Applicant: SAMSUNG ELECTRONICS CO., LTD., Suwon-si (KR)

(72) Inventors: Seung Eon Kim, Suwon-si (KR); Won Hee Lee, Suwon-si (KR); Jun Hyuk Kim, Suwon-si (KR); Jeong Won Kim, Suwon-si (KR); Young Hun Sung, Suwon-si (KR); Won Seop Song, Suwon-si (KR); Jung Yeop Yang, Suwon-si (KR); Do Kwan Oh, Suwon-si (KR); Sung Ho Jun, Suwon-si (KR); Woo Suk Choi, Suwon-si (KR); Jong Seong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/743,551

(22) Filed: Jun. 14, 2024

(65) Prior Publication Data

US 2025/0150640 A1     May 8, 2025

(30) Foreign Application Priority Data

Nov. 6, 2023    (KR) ........................ 10-2023-0152118
Jan. 3, 2024    (KR) ........................ 10-2024-0000748

(51) Int. Cl.
*H04N 19/91*       (2014.01)
*G06V 10/82*       (2022.01)
(Continued)

(52) U.S. Cl.
CPC ............. *H04N 19/91* (2014.11); *G06V 10/82* (2022.01); *H04N 19/119* (2014.11); *H04N 19/184* (2014.11)

(58) Field of Classification Search
None
See application file for complete search history.

(56) References Cited

U.S. PATENT DOCUMENTS 7,395,210 B2    7/2008  Li
8,270,738 B2    9/2012  Raveendran et al.
(Continued)

FOREIGN PATENT DOCUMENTS

KR          10-1006287 B1     1/2011
KR     10-2020-0138079 A     12/2020

OTHER PUBLICATIONS

Cheng et al., "Learned Lossless Image Compression with a HyperPrior and Discretized Gaussian Mixture Likelihoods", arXiv:2002. 01657v1 [eess.IV] Feb. 5, 2020 (6 pages total).
(Continued)

*Primary Examiner* — Samuel D Fereja
(74) *Attorney, Agent, or Firm* — Sughrue Mion, PLLC

(57)                ABSTRACT
There is provide an image encoding method including transforming an image block into a first latent representation based on an invertible neural network, transforming the first latent representation into a second latent representation based on a non-invertible neural network, estimating a probability distribution of the first latent representation, and performing entropy encoding on the first latent representation based on the probability distribution by using an entropy encoder.

17 Claims, 15 Drawing Sheets

(51) Int. Cl.
    *H04N 19/119*     (2014.01)
    *H04N 19/184*     (2014.01)
    *H04N 19/82*     (2014.01)

(56)           References Cited

U.S. PATENT DOCUMENTS

| | | |
|---|---|---|
| 11,153,586 B2 | 10/2021 | Jun |
| 2020/0177899 A1 | 6/2020 | Jun |
| 2022/0101492 A1 | 3/2022 | Ding et al. |
| 2022/0277491 A1 | 9/2022 | Lee et al. |
| 2023/0154053 A1 | 5/2023 | Lin et al. |
| 2023/0154055 A1* | 5/2023 | Besenbruch .......... H04N 19/13 |
| | | 375/240.03 |

OTHER PUBLICATIONS

Yoon et al., "Optimized Lossless Embedded Compression for Mobile Multimedia Applications", Electronics, 2020, vol. 9, No. 868, pp. 1-16 (16 pages total).

Hoogeboom et al., "Integer Discrete Flows and Lossless Compression", 33rd Conference on Neural Information Processing Systems (NeurIPS 2019), Vancouver, Canada, 2019, pp. 1-11 (11 pages total).

Wang et al., "Fast Lossless Neural Compression with Integer-Only Discrete Flows", Proceedings of the 39th International Conference on Machine Learning, Baltimore, Maryland, USA, PMLR 162, 2022, (14 pages total).

Communication issued Nov. 13, 2024 by the European Patent Office in European Patent Application No. 24182853.2.

Xie, Yueqi et al., "Enhanced Invertible Encoding for Learned Image Compression", Session 4: Deep Learning for Multimedia-III, MM '21, Oct. 20-24, 2021, Virtual Event, China, pp. 162-170. (9 pages total).

Cai, Shilv et al., "High-Fidelity Variable-Rate Image Compression via Invertible Activation Transformation", arXiv:2209.05054v1 [eess. IV], Sep. 12, 2022. (9 pages total).

Helminger, Leonhard et al., "Lossy Image Compression with Normalizing Flows", arXiv:2008.10486v1 [cs.CV], Aug. 24, 2020. (12 pages total).

* cited by examiner

FIG. 11

APPARATUS AND METHOD FOR IMAGE ENCODING AND DECODING

CROSS-REFERENCE TO RELATED APPLICATION(S)

This application is based on and claims priority from Korean Patent Application No. 10-2023-0152118, filed on Nov. 6, 2023, and 10-2024-0000749, filed on Jan. 3, 2024, in the Korean Intellectual Property Office, the entire disclosure of which is incorporated herein by reference for all purposes.

BACKGROUND

1. Field

The disclosure relates to an encoding and decoding apparatus and an encoding and decoding method, and in particular, to an apparatus and a method for neural network-based encoding and decoding of an image.

2. Description of the Related Art

Recently, the internet video market is continuously growing. However, since a video contains a much larger amount of data compared to media such as voice, text, photo, etc., and since the type or quality of services may be limited by network bandwidth, high-level video coding technology is required. A related art technique for image data compression is Frame Buffer Compression (FBC), which may provide efficient use of dynamic random access memory (DRAM) bandwidth during image data transmission between intellectual properties (IPs) in the System on Chip (SoC).

SUMMARY

According to an aspect of the disclosure, there is provided an image encoding method including: transforming an image block into a first latent representation based on an invertible neural network; transforming the first latent representation into a second latent representation based on a non-invertible neural network; estimating a first probability distribution of the first latent representation based on the second latent representation; and performing entropy encoding on the first latent representation based on the first probability distribution by using a first entropy encoder.

The invertible neural network may include a normalizing-flow neural network including one or more coupling layers.

A parameter of the one or more coupling layers may be obtained through training based on at least one of a neural network structure or data distribution.

The estimating of the first probability distribution may include: dividing the first latent representation into a plurality of groups, and estimating the first probability distribution for each of the plurality of groups.

The method of claim 1, may further include performing entropy encoding on the second latent representation based on a second probability distribution by using a second entropy encoder.

The transforming of the first latent representation into the second latent representation may include transforming the first latent representation into the second latent representation by using a hyperprior encoder.

The estimating of the first probability distribution may include obtaining a hyperprior as a probability distribution of the first latent representation by using a hyperprior decoder.

The estimating of the first probability distribution may include: obtaining a hyperprior based on a result of entropy decoding of the second latent representation by using a hyperprior decoder; and estimating the first probability distribution of the first latent representation based on the hyperprior by using a context estimator.

The method may further include dividing the image block into a plurality of sub-blocks.

The method may further include performing an operation within each of the plurality of sub-blocks based on one or more coupling layers of a normalizing-flow neural network.

The method may further include performing an operation between the plurality of sub-blocks based on one or more coupling layers of a normalizing-flow neural network.

The operation between the plurality of sub-blocks may be performed by at least one of a hyperprior encoder, a hyperprior decoder, or a context estimator.

The transforming of the image block into the first latent representation may include transforming the image block into the first latent representation by hierarchically using two or more first modules.

The transforming of the image block into the first latent representation may include inputting a portion of a third latent representation, which is transformed by a first module of a previous layer, to a first module of a next layer to transform the portion of the third latent representation into a fourth latent representation, and combining a remaining portion of the third latent representation with the fourth latent representation to transform the combined latent representation into the first latent representation.

According to another aspect of the disclosure, there is provided an image decoding method including: receiving a first bitstream of a first latent representation, obtained by transforming an image block based on an invertible neural network; receiving a second bitstream of a second latent representation obtained by transforming the first latent representation based on a non-invertible neural network; estimating a first probability distribution of the first latent representation based on the second bitstream; and reconstructing the image block based on the first bitstream and the first probability distribution.

The method may further include entropy decoding the first bitstream based on the first probability distribution of the first latent representation by using a first entropy decoder, wherein the reconstructing of the image block includes reconstructing the image block based on a result of the entropy decoding of the first bitstream and the first probability distribution.

The method may further include entropy decoding the second bitstream based on a second probability distribution by using a second entropy decoder.

The estimating of the first probability distribution of the first latent representation may include obtaining a hyperprior based on a result of decoding of the second bitstream, and estimating the first probability distribution of the first latent representation based on the hyperprior.

According to another aspect of the disclosure, there is provided an electronic device including: a memory storing one or more instructions, and a processor configured to execute the one or more instructions to implement: an invertible neural network configured to transform an image block into a first latent representation; a non-invertible neural network configured to: transform the first latent representation into a second latent representation, and estimate a first probability distribution of the first latent representation based on the second latent representation; and an entropy encoder configured to perform entropy encoding on the first latent representation based on the first probability distribution.

According to another aspect of the disclosure, there is provided an electronic device including: a memory storing one or more instructions, and a processor configured to execute the one or more instructions to implement: a non-invertible neural network configured to: receive first bit-stream of a first latent representation obtained by transforming an image block, and a second bitstream of a second latent representation obtained by transforming the first latent representation, and estimate a probability distribution of the first latent representation; and an invertible neural network configured to reconstruct an image based on the first bit-stream and the estimated probability distribution.

BRIEF DESCRIPTION OF DRAWINGS

Embodiments of the disclosure are illustrated in the accompanying drawings, throughout which like reference letters indicate corresponding parts in the various figures. The embodiments herein will be better understood from the following description with reference to the drawings, in which:

FIG. 11 is a block diagram illustrating an example of an image processing device included in an electronic device.

DETAILED DESCRIPTION

Figure 1:
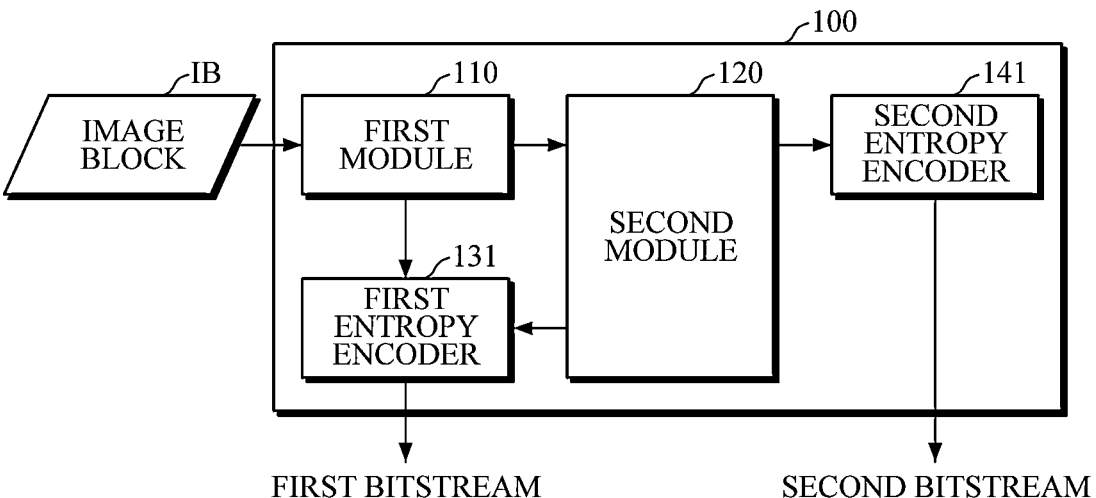
FIG. 1 is a block diagram illustrating an image encoding apparatus according to an embodiment of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Throughout the drawings and the detailed description, unless otherwise described, the same drawing reference numerals will be understood to refer to the same elements, features, and structures.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. For example, one or more elements or components of an apparatus described herein may be combined or separated without deviating from the scope of the disclosure of this application. As is traditional in the field, embodiments may be described and illustrated in terms of blocks, as shown in the drawings, which carry out a described function or functions. These blocks, which may be referred to herein as units or modules or the like, or by names such as device, logic, circuit, encoder, decoder, counter, comparator, generator, converter, or the like, may be physically implemented by analog and/or digital circuits including one or more logic gates, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Throughout the disclosure, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprising", "including", "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is a block diagram illustrating an image encoding apparatus 100 according to an embodiment of the disclosure.

According to an embodiment, the image encoding apparatus 100 may be included in various electronic devices including, but not limited to, various image transmission, reception or processing devices, such as televisions, monitors, Internet of Things (IoT) devices, radar devices, smart phones, wearable devices, tablet PCs, netbooks, laptops, desktop computers, head mounted displays (HMIDs), autonomous vehicles, Virtual Reality (VR) devices, Augmented Reality (AR) devices, eXtended Reality (XR) devices, automobiles, mobile robots, etc., as well as cloud computing devices, and the like.

The image encoding apparatus 100 may be used in an environment where operations may be performed in units of blocks for random access of data. According to an embodiment, the image encoding apparatus 100 may perform lossless compression with a high compression ratio by using both lossless image compression and lossy image compression. For example, the lossless compression with a high compression ratio may be applied to Frame Buffer Compression (FBC). In this manner, it is possible to reduce power consumption by reducing bandwidth between IP and DRAM in the System on Chip (SoC), and the image encoding apparatus 100 may be used for image data transmission between various devices and/or servers.

Referring to FIG. 1, the image encoding apparatus 100 may include a first module 110, a second module 120, a first entropy encoder 131, and a second entropy encoder 141. According to an embodiment, the image encoding apparatus 100 may include a memory storing one or more instructions and a processor configured to execute the one or more instructions to perform one or more operations of the image encoding apparatus 100. For example, the memory may store program codes or instruction sets corresponding to the first module 110, the second module 120, the first entropy encoder 131, and the second entropy encoder 141. According to an embodiment, the processor may execute that one or more instructions stored in the memory to implement the first module 110, the second module 120, the first entropy encoder 131, and the second entropy encoder 141. According to an embodiment, the processor may include one or more processors. According to an embodiment, the processor may include, but is not limited to, one or more logic gates, an integrated circuit, a microprocessor, a microcontroller, a memory circuit, a passive electronic component, an active electronic component, an optical component, and the like.

The first module 110 may transform an image block IB, used as an input, into a first latent representation. The first module 110 may include an invertible neural network that performs lossless compression, and may transform the image block IB into the first latent representation by using a non-invertible neural network. The non-invertible neural network may be a normalizing-flow neural network. The normalizing-flow neural network may include one or more coupling layers, and the one or more coupling layers may be modified according to various manner. According to an embodiment, one or more parameters of the one or more coupling layers may be obtained by training. For example, the one or more parameters may include, but is not limited to, a division ratio, an element to be selected, etc. The one or more parameters of the one or more coupling layers may be obtained based on a neural network structure, data distribution, etc. According to an embodiment, the one or more parameters of the one or more coupling layers may be updated by retraining using image encoding and decoding results as training data.

Here, the term "latent representation" refers to an output of a neural network using an input image or motion information as input, and may collectively refer to a latent feature, latent vector, and the like.

The second module 120 may transform the first latent representation, output by the first module 110, into a second latent representation, and may estimate a probability distribution of the first latent representation based on the transformed second latent representation. The probability distribution may include a mean and a standard deviation a. The second module 120 may estimate the probability distribution by applying various probability models. The probability model may include, but is not limited to, a Laplacian distribution model or a Gaussian distribution model.

The second module 120 may include a non-invertible neural network that performs lossy compression. According to an embodiment, the non-invertible neural network may include a Hyperprior Encoder, a Hyperprior Decoder, and/or a context estimator. However, the non-invertible neural network is not limited thereto, and as such, according to an embodiment, the non-invertible neural network may include various other neural networks, such as Convolutional Neural Network (CNN), Recurrent Neural Network (RNN), transformer-based neural network, etc., which may be used in appropriate combination.

The first entropy encoder 131 may perform entropy encoding on the first latent representation based on an input probability distribution, by using as input the first latent representation transformed by the first module 110 and the probability distribution estimated by the second module 120. Further, the first entropy encoder 131 may output a first bitstream of the first latent representation as a result of the image encoding. The entropy encoding may be performed using an arithmetic encoding technique and an arithmetic decoding technique, but is not limited thereto.

The second entropy encoder 141 may perform entropy encoding on the second latent representation based on an input probability distribution, by using as input the second latent representation transformed by the second module 120 and a probability distribution obtained by training. For example, the second entropy encoder 141 may perform entropy encoding on the second latent representation based on an input probability distribution, by using as input the second latent representation transformed by the second module 120 and a reference probability distribution obtained by training. The reference probability distribution may be a predetermined probability distribution. Further, the second entropy encoder 141 may output a second bitstream of the second latent representation as a result of the image encoding. The entropy encoding may be performed using an arithmetic encoding technique and an arithmetic decoding technique, but is not limited thereto.

The first bitstream, which are entropy-encoded by the first entropy encoder 131, and the second bitstream, which are entropy-encoded by the second entropy encoder 141, may be transmitted to another IP in the SoC through the DRAM and the like. However, the transmission of the bitstreams is not limited thereto, and as such, according to another embodiment, the bitstreams may be transmitted to an external electronic device through wired and wireless communications.

Figure 2A:
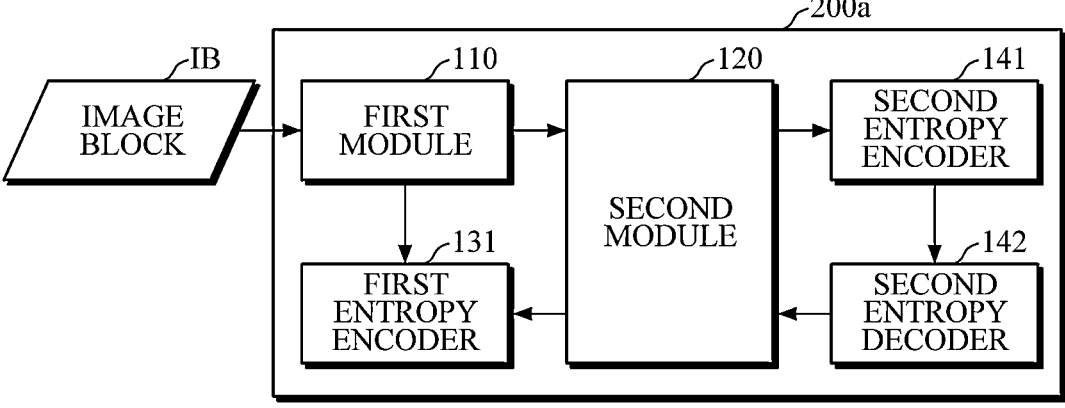
FIGS. 2A to 2C are block diagrams illustrating an image encoding apparatus according to other embodiments of the disclosure.
Figure 2B:
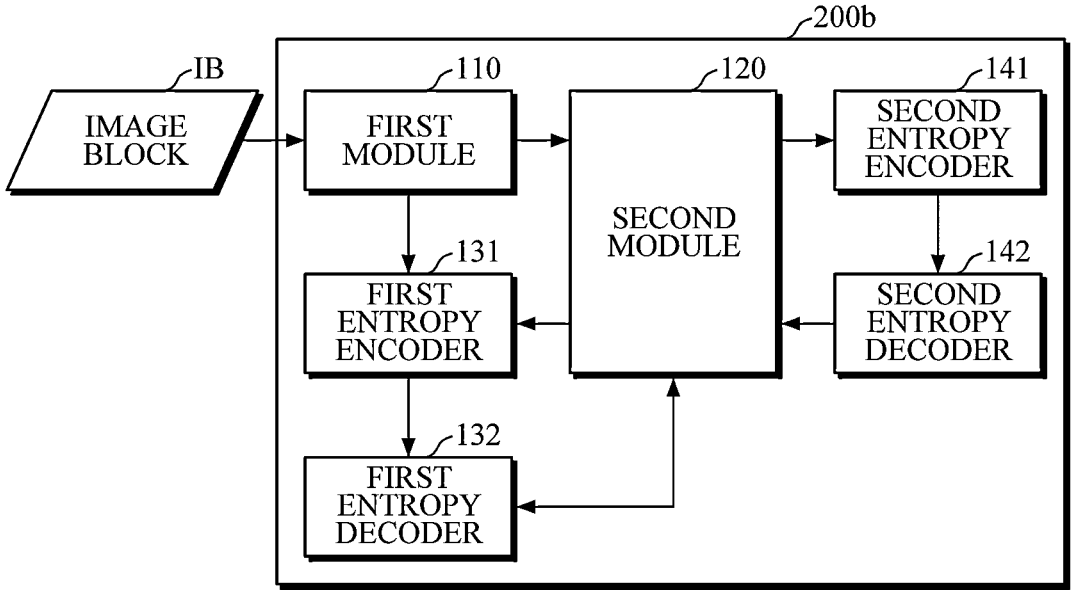
Figure 2C:
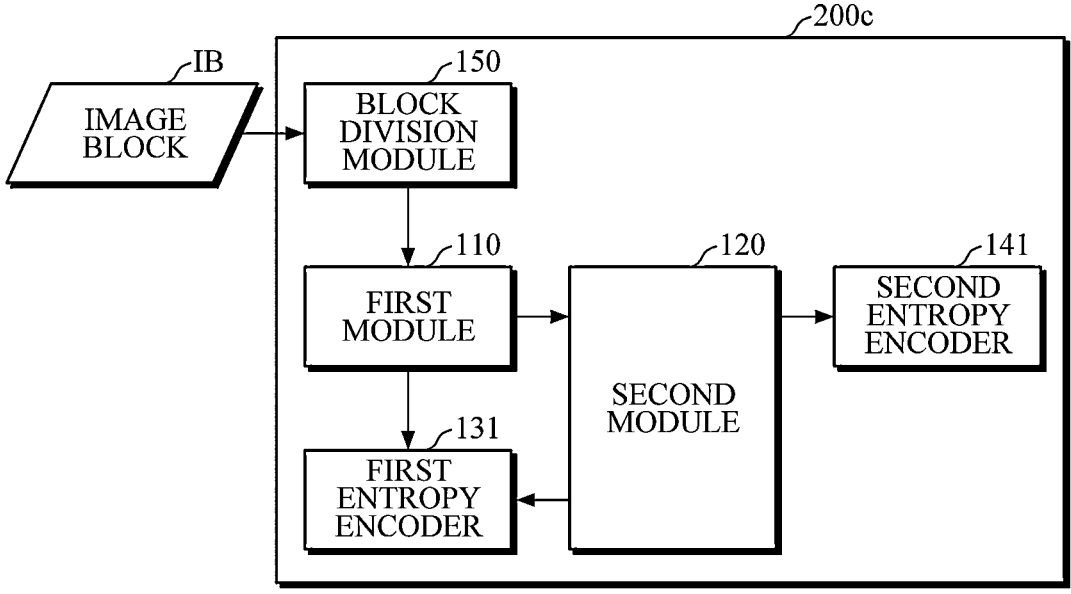

FIGS. 2A to 2C are block diagrams illustrating an image encoding apparatus according to other embodiments of the disclosure.

Referring to FIG. 2A, an image encoding apparatus 200a may include the first module 110, the second module 120, the first entropy encoder 131, the second entropy encoder 141, and a second entropy decoder 142. A detailed description of the first module 110, the second module 120, the first entropy encoder 131, and the second entropy encoder 141 will be omitted.

The second entropy decoder 142 may reconstruct the second latent representation by performing entropy decoding by using, as input, the second bitstream of the second latent representation, which is generated by the second entropy encoder 141, and the probability distribution predefined by training. The reconstructed second latent representation may be input to the second module 120, and the second module 120 may estimate the probability distribution of the first latent representation based on the input second latent representation. The entropy decoding may be performed by an arithmetic encoding technique and an arithmetic decoding technique, but is not limited thereto.

Referring to FIG. 2B, an image encoding apparatus 200b may include the first module 110, the second module 120, the first entropy encoder 131, the first entropy decoder 132, the second entropy encoder 141, and the second entropy decoder 142. According to an embodiment, the second entropy decoder 142 may be omitted. A detailed description of the first module 110, the second module 120, the first entropy encoder 131, the second entropy encoder 141, and the second entropy decoder 142 will be omitted.

The second module 120 may divide an image block IB of the first latent representation into a plurality of sub-blocks, and may estimate the probability distribution of the first latent representation for each sub-block. According to an embodiment, a result of entropy decoding performed by the first entropy decoder 132 for a previous sub-block may be input to the second module 120, and the second module 120 may estimate the probability distribution of the first latent representation for a current sub-block based on a result of entropy decoding of previous sub-blocks (the reconstructed first latent representation for the previous sub-blocks). For example, when estimating the probability distribution for a first sub-block, the second module 120 may estimate the probability distribution by using only the result of entropy decoding performed by the second entropy decoder 142, and when estimating the probability distribution for an nth sub-block (n being an integer greater than 2), the second module 120 may estimate the probability distribution by using the result of entropy decoding performed by the second entropy decoder 142 and a result of entropy decoding performed by the first entropy decoder 132 for the first to n−1th sub-blocks.

By using, as input, the first latent representation transformed by the first module 110 and the probability distribution estimated by the second module 120, the first entropy encoder 131 may perform entropy encoding on the first latent representation. According to an embodiment, the first entropy encoder 131 may perform entropy encoding on the first latent representation for each sub-block based on the probability distribution of the first latent representation which is estimated for each sub-block by the second module 120.

The first entropy decoder 132 may reconstruct the first latent representation by performing entropy decoding based on an input probability distribution, by using as input the first bitstream of the first latent representation and the probability distribution estimated by the second module 120. According to an embodiment, the reconstructed first latent representation for the sub-block may be input to the second module 120, to be used for estimating the probability distribution of the first latent representation for a next sub-block. The entropy decoding may be performed by an arithmetic encoding technique and an arithmetic decoding technique, but is not limited thereto.

Referring to FIG. 2C, an image encoding apparatus 200c may include the first module 110, the second module 120, the first entropy encoder 131, the second entropy encoder 141, and a block division module 150. According to an embodiment, the image encoding apparatus 200c may further include the first entropy decoder 132 and/or the second entropy decoder 142. A detailed description of the first module 110, the second module 120, the first entropy encoder 131, the first entropy decoder 132, the second entropy encoder 141, and the second entropy decoder 142 will be omitted.

According to an embodiment, the block division module 150 may divide an input image block into sub-blocks. For example, the block division module 150 may divide an input image block of a predetermined size (e.g., 4×32) into sub-blocks of a predetermined unit size (e.g., 4×4) in consideration of locality of the image. According to an embodiment, the unit size may be predefined in consideration of computing power, target decoding accuracy, and the like.

The first module 110 may transform the image block into a first latent representation in units of sub-blocks by using an invertible neural network. The invertible neural network may include one or more normalizing-flow neural networks. The normalizing-flow neural network may include one or more first coupling layers configured to perform an operation within the sub-blocks. In addition, the normalizing-flow neural network may further include one or more second coupling layers configured to perform an operation between the first coupling layers or between sub-blocks in the last layer. The first coupling layer and the second coupling layer may be included in separate normalizing-flow neural networks.

The second module 120 may transform the first latent representation into a second latent representation in units of sub-blocks by using a non-invertible neural network, and may estimate a probability distribution of the first latent representation. The non-invertible neural network may include a Hyperprior Encoder, a Hyperprior Decoder, and/or a context estimator. The non-invertible neural network may be configured to perform an operation within the sub-blocks and/or between the sub-blocks. The second module 120 may estimate the probability distribution of the first latent representation for a current sub-block based on a result of entropy decoding of previous sub-blocks (the reconstructed first latent representation for the previous sub-blocks).

The first entropy encoder 131 may perform entropy encoding on the first latent representation by using, as an input, the probability distribution estimated by the second module 120, and may output a bitstream of the first latent representation. The first entropy decoder 132 may reconstruct the first latent representation by performing entropy decoding on the bitstream of the first latent representation by using, as an input, the probability distribution estimated by the second module 120.

The second entropy encoder 141 may output a bitstream of the second latent representation by performing entropy encoding on the second latent representation by using the probability distribution predefined by training. The second entropy decoder 142 may reconstruct the second latent representation by performing entropy decoding on the bitstream of the second latent representation by using the probability distribution predefined by training.

Figure 3A:
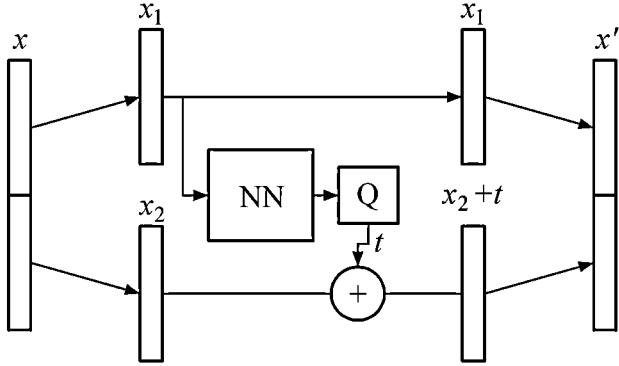
FIGS. 3A and 3B are examples of a coupling layer in normalizing flow.
Figure 3B:
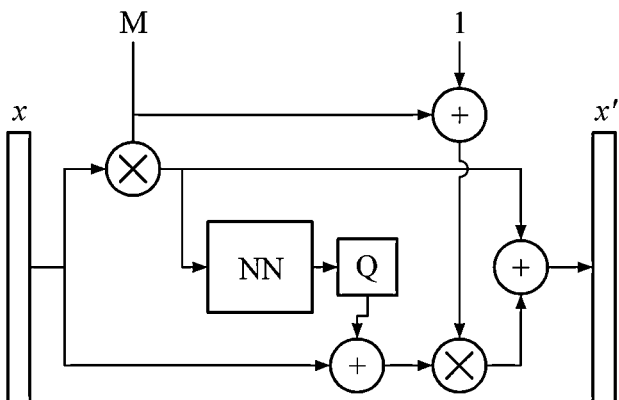

FIGS. 3A and 3B are examples of a coupling layer in normalizing flow.

Referring to FIG. 3A, the coupling layer of the normalizing-flow neural network may be configured to divide an input image block x into a first image block $x_1$ and a second image block $x_2$ in a ratio, process the first image block $x_1$ to combine a result t of the processing with the second image block $x_2$, and combine a combination result $x_2+t$ with the first image block $x_1$ to output a first latent representation x' of the image block x. According to an embodiment, the ratio may be preset. According to an embodiment, the first image block $x_1$ may be processed in such a manner that the first image block $x_1$ is input to the neural network NN to be inferred by the neural network NN, followed by quantizing Q a result of the inference, and the result t may be added to the second image block $x_2$. The normalizing-flow neural network may include a plurality of coupling layers to repeatedly perform the coupling process.

Referring to FIG. 3B, the dividing of the image block in a ratio (FIG. 3A) in the coupling layer of the normalizing-flow neural network may be modified to masking of a parameter by inputting a mask M predefined by training. For example, instead of dividing the input image block x into a first image block $x_1$ and a second image block $x_2$, the method may include masking a parameter of the coupling layer by inputting a mask M. According to an embodiment, the ratio may be preset. According to an embodiment, the mask M may contain information related to parameters including a ratio for dividing the image block, an element to be selected or passed in the image block, and the like. The mask M may be determined by training in consideration of a structure of the neural network NN, data distribution, and the like. The mask M may be determined by training using learnable parameters and/or quantization by Straight Through Estimator (STE). The mask M may be updated, at predetermined intervals or when needed, by training using results of encoding and/or decoding of the image block as training data. In this manner, the effect of random seed may be reduced, a hand-crafted feature may be reduced, and performance may be improved by optimization.

Figure 4:
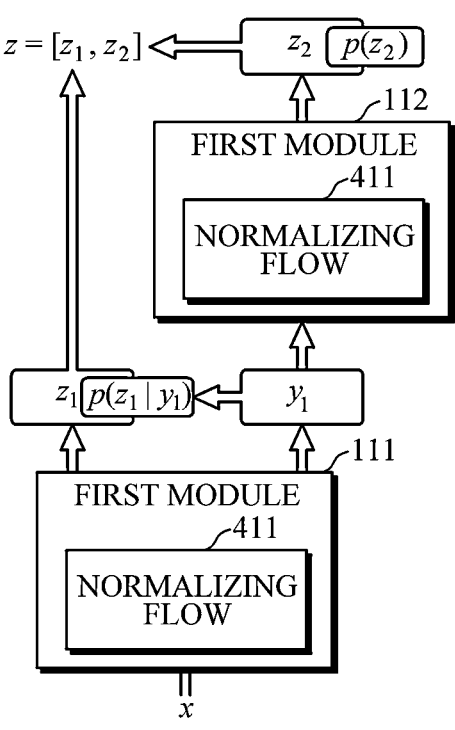
FIG. 4 is a diagram illustrating an example of applying an invertible neural network-based module in multiple layers.

FIG. 4 is a diagram illustrating an example of applying an invertible neural network-based module in multiple layers.

Referring to FIG. 4, the image encoding apparatuses 100, 200a, 200b, and 200c may transform the image block x into a first latent representation z by hierarchically using a plurality of first modules 110. For example, the plurality of first modules 110 may include a first first module 111 and a second first module 112. The first first module 111 and the second first module 112 may include a normalizing-flow neural network 411. The image block x is input to the first first module 111 in a first layer to be transformed into a latent representation by the normalizing-flow neural network 411, and the transformed latent representation is divided into two parts $z_1$ and $y_1$. A divided portion $y_1$ of the latent representation is input to the second first module 112 in a second layer, to be transformed into a second latent representation $z_2$ by the normalizing-flow neural network 411. The transformed latent representation $z_2$ is combined with the portion $z_1$ of the transformed latent representation in the first layer to generate a final latent representation. While FIG. 4 illustrates two layers, but the layers are not limited thereto, and the method performed in the first layer may be repeated in subsequent layers, thereby extending to three or more layers.

Figure 5A:
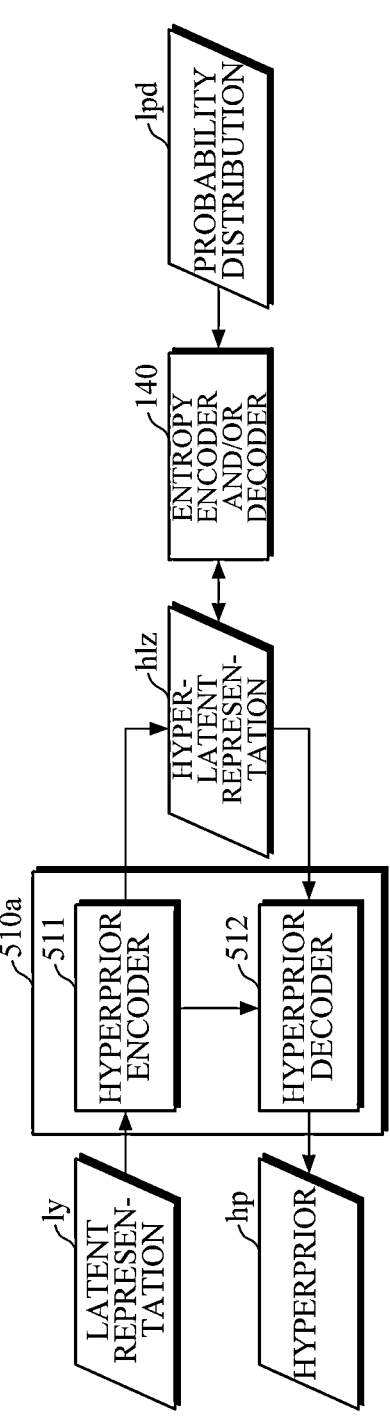
FIGS. 5A and 5B are block diagrams illustrating a non-invertible neural network-based module according to embodiments of the disclosure.
Figure 5B:
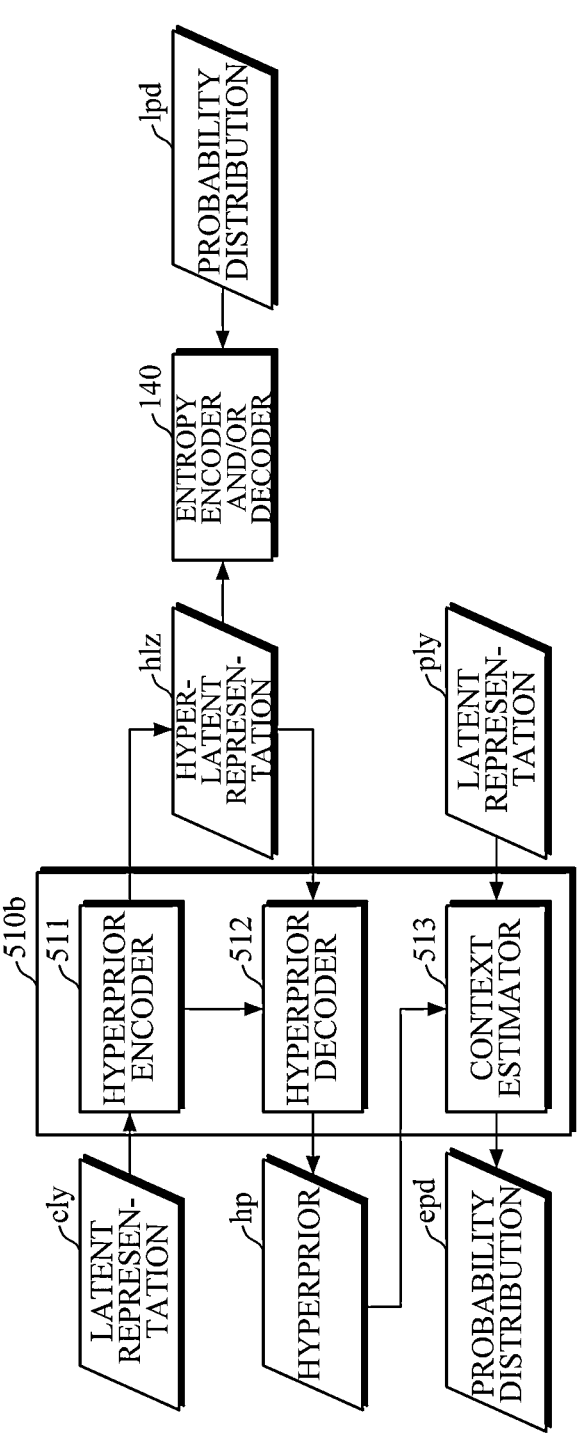

FIGS. 5A and 5B are block diagrams illustrating a non-invertible neural network-based module according to embodiments of the disclosure.

Referring to FIG. 5A, a second module 510a according to an embodiment of the disclosure may include a hyperprior encoder 511 and a hyperprior decoder 512. The second module 510a may be based on a non-invertible neural network.

The hyperprior encoder 511 may output a hyper-latent representation hlz by using a latent representationly, output by the first module 110, as an input. An entropy encoder and/or decoder 140 may perform entropy encoding and/or decoding on the hyper-latent representation hlz by using a probability distribution lpd as an input. The probability distribution lpd may be a pretrained probability distribution. A bitstream of the hyper-latent representation hlz is output by performing entropy encoding. According to an embodiment, the probability distribution is obtained by Gaussian modeling based on a trained parameter, but is not limited thereto. The hyper-latent representation hlz, reconstructed as a result of entropy decoding, is input to the hyperprior decoder 512. The hyperprior decoder 512 may output a hyperprior hp by decoding the hyper-latent representation hlz. According to an embodiment, the hyperprior hp represents a feature vector for expressing the latent representationly as a probability distribution. The hyperprior hp output by the hyperprior decoder 512 may be input as a probability distribution to the first entropy encoder 131 and/or the first entropy decoder 132.

Referring to FIG. 5B, a second module 510b according to another embodiment of the disclosure may include the hyperprior encoder 511, the hyperprior decoder 512, and a context estimator 513. The second module 510b may be based on a non-invertible neural network.

The hyperprior encoder 511 may output a hyper-latent representation hlz by using a latent representation cly, output by the first module 110, as an input. The entropy encoder and/or decoder 140 may perform entropy encoding and/or decoding on the hyper-latent representation hlz by using a pre-trained probability distribution lpd as an input. A bitstream of the hyper-latent representation hlz is output by performing entropy encoding. According to an embodiment, the probability distribution is obtained by Gaussian modeling based on a trained parameter, but is not limited thereto. The hyper-latent representation hlz, reconstructed as a result of entropy decoding, is input to the hyperprior decoder 512. The hyperprior decoder 512 may output a hyperprior hp by decoding the hyper-latent representation hlz. According to an embodiment, the hyperprior hp represents a feature vector for expressing the latent representationly as a probability distribution. The hyperprior hp output by the hyperprior decoder 512 is input to the context estimator 513, and the context estimator 513 may estimate a probability distribution of the latent representation cly by using the hyperprior hp. The context estimator 513 may divide the latent representation cly into a plurality of sub-blocks, and when estimating a probability distribution of the current latent representation cly, the context estimator 513 may estimate a probability distribution epd by using a latent representation ply which is entropy-encoded and entropy-decoded for a previous sub-block. The estimated probability distribution epd may be input as a probability distribution to the first entropy encoder 131 and/or the first entropy decoder 132.

Figure 6:
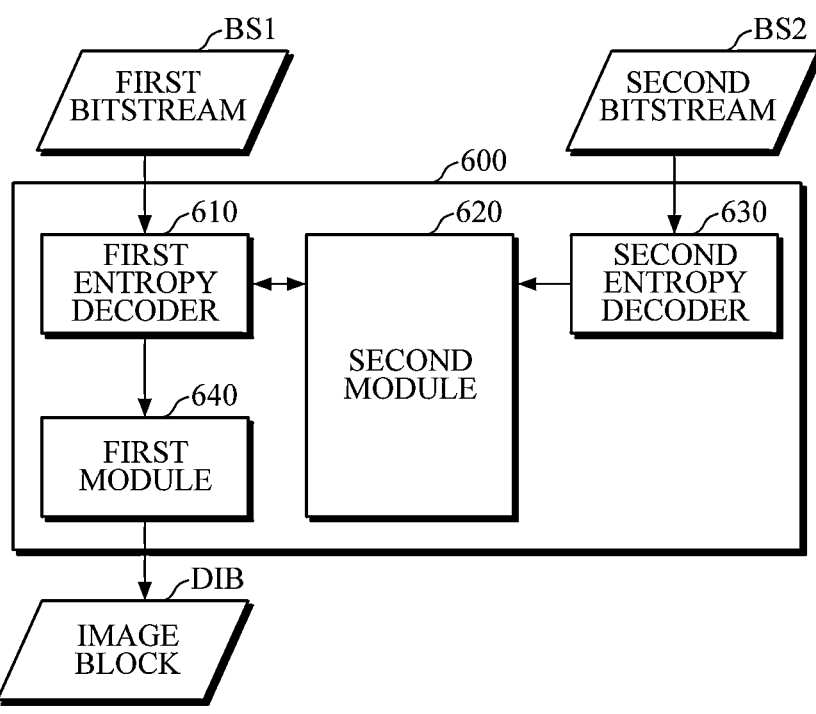
FIG. 6 is a block diagram illustrating an image decoding apparatus according to an embodiment of the disclosure.

FIG. 6 is a block diagram illustrating an image decoding apparatus according to an embodiment of the disclosure.

Referring to FIG. 6, an image decoding apparatus 600 may include a first entropy decoder 610, a second module 620, a second entropy decoder 630, and a first module 640. According to an embodiment, the image decoding apparatus 600 may include a memory storing one or more instructions and a processor configured to execute the one or more instructions to perform one or more operations of the image decoding apparatus 600. For example, the memory may store program codes or instruction sets corresponding to the first entropy decoder 610, the second module 620, the second entropy decoder 630, and the first module 640. According to an embodiment, the processor may execute that one or more instructions stored in the memory to implement the first entropy decoder 610, the second module 620, the second entropy decoder 630, and the first module 640. According to an embodiment, the processor may include one or more processors. According to an embodiment, the processor may include, but is not limited to, one or more logic gates, an integrated circuit, a microprocessor, a microcontroller, a memory circuit, a passive electronic component, an active electronic component, an optical component, and the like.

The first entropy decoder 610 may reconstruct a first latent representation by performing entropy decoding by using, as an input, a first bitstream BS1 generated by the image encoding apparatuses 100, 200a, 200b, and 200c of FIGS. 1, 2A, 2B, and 2C. The first entropy decoder 610 may reconstruct the first latent representation based on a probability distribution estimated by the second module 620 which is based on a non-invertible neural network. The second module 620, which is based on the non-invertible neural network, may estimate the probability distribution based on the second latent representation reconstructed by the second entropy decoder 630. The second entropy decoder 630 may reconstruct a second latent representation by performing entropy decoding by using, as an input, a second bitstream BS2 generated by the image encoding apparatuses 100, 200a, 200b, and 200c of FIGS. 1, 2A, 2B, and 2C. By using an invertible neural network, the first module 640 may reconstruct an image block by using, as an input, the first latent representation reconstructed by the first entropy decoder 610. A detailed description of the first entropy decoder 610, the second module 620, the second entropy decoder 630, and the first module 640 will be omitted, which basically perform the same functions as the first entropy decoder 131, the second module 120, the second entropy decoder 142, and the first module 110 of the aforementioned image encoding apparatuses 100 and 200.

Figure 7:
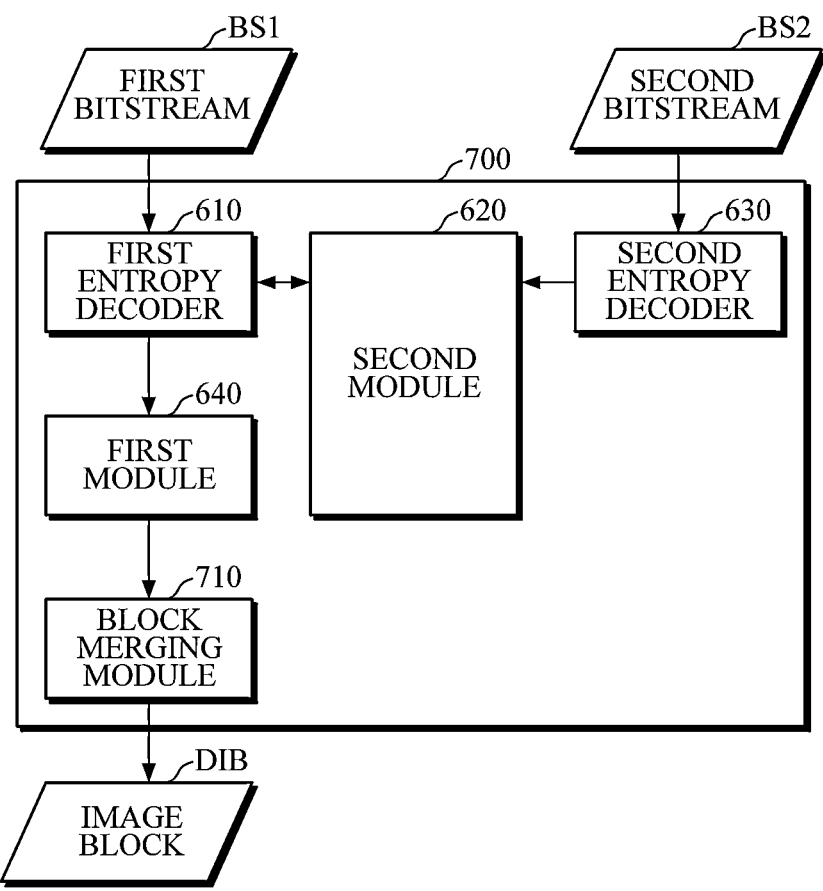
FIG. 7 is a block diagram illustrating an image decoding apparatus according to another embodiment of the disclosure.

FIG. 7 is a block diagram illustrating an image decoding apparatus according to another embodiment of the disclosure.

Referring to FIG. 7, an image decoding apparatus 700 may include the first entropy decoder 610, the second module 620, the second entropy decoder 630, the first module 640, and a block merging module 710. The first entropy decoder 610, the second module 620, the second entropy decoder 630, and the first module 640 are described above, such that a detailed description thereof will be omitted. In the case where the image encoding apparatus 200c (see FIG. 2C) divides an image block into a plurality of sub-blocks and performs image decoding for each sub-block, the block merging module 710 may reconstruct the image block by merging the sub-blocks reconstructed by the first module 640.

Figure 8:
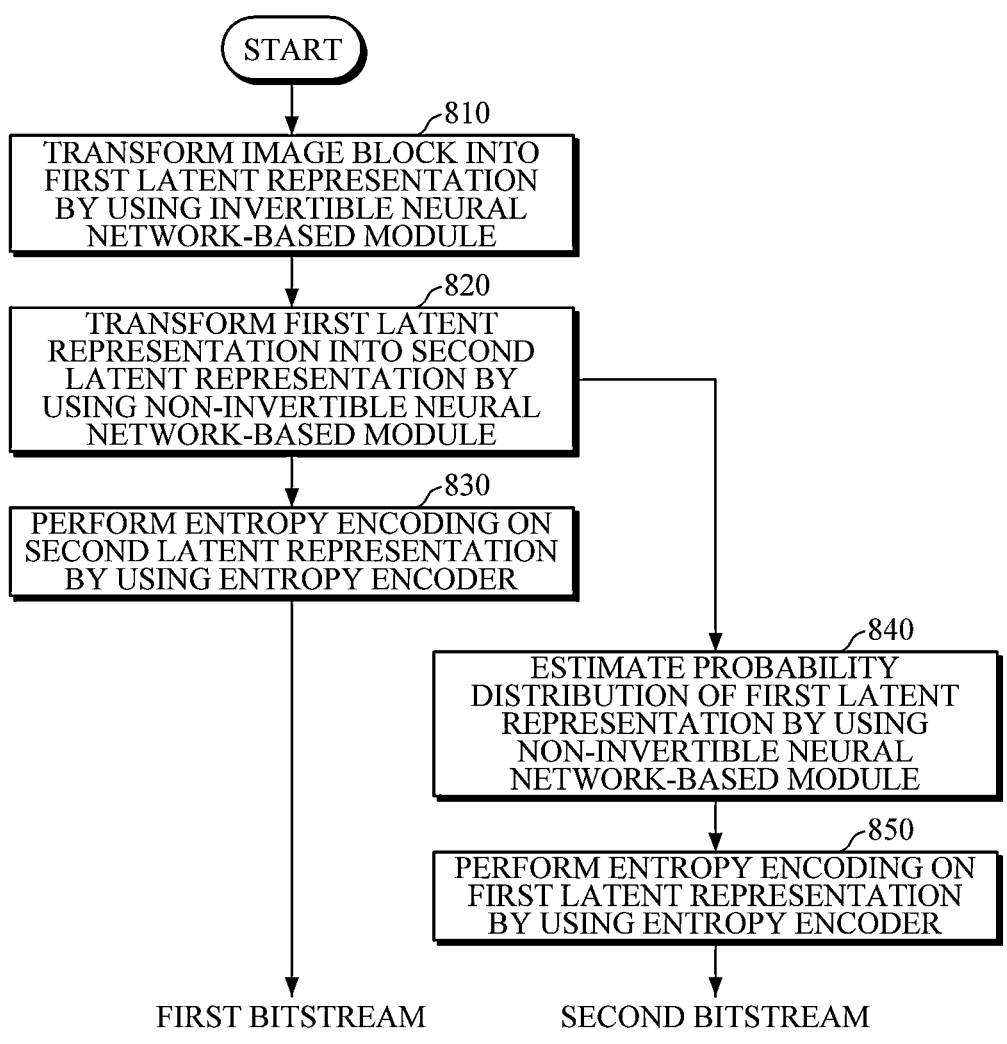
FIG. 8 is a flowchart illustrating an image encoding method according to an embodiment of the disclosure.

FIG. 8 is a flowchart illustrating an image encoding method according to an embodiment of the disclosure.

The method of FIG. 8 is an example of an image encoding method performed by the aforementioned image encoding apparatuses 100, 200a, 200b, and 200c, which will be briefly described below in order to avoid redundancy.

According to an embodiment, in operation 810, the method may include transforming an image block into a first latent representation. For example, the image encoding apparatus may transform an image block into a first latent representation by using an invertible neural network-based module. For example, before being input to the invertible neural network-based module, the image block is divided into a plurality of sub-blocks, and the invertible neural network-based module may perform an operation in units of sub-blocks to transform the image block into the first latent representation. The invertible neural network may include a normalizing-flow neural network. According to an embodiment, in an example case in which the image block is divided into a plurality of sub-blocks, coupling layers of the normalizing-flow neural network may be configured to perform an operation within the sub-blocks and/or between the sub-blocks. Further, for example, a parameter (e.g., a division ratio, an element to be selected, etc.) of the coupling layer may be predefined by training in consideration of a neural network structure, data distribution, etc., and may be updated by retraining using image encoding and decoding results as training data. For example, the image encoding apparatus may transform the image block into the first latent representation by hierarchically using a plurality of invertible neural network-based modules.

In operation 820, the method may include transforming the first latent representation into a second latent representation. For example, the image encoding apparatus may transform the first latent representation into a second latent representation by using the non-invertible neural network-based module. The non-invertible neural network may include a Hyperprior Encoder, a Hyperprior Decoder, a context estimator, Convolutional Neural Network (CNN), Recurrent Neural Network (RNN), transformer-based neural network, etc., which may be used in appropriate combination.

In operation 830, the method may include performing entropy encoding on the second latent representation. For example, the image encoding apparatus may perform entropy encoding on the second latent representation (e.g., transformed in operation 820), by using the entropy encoder. The image encoding apparatus may output a bitstream of the second latent representation as a result of the entropy encoding. The entropy encoding may be performed using an arithmetic encoding technique and an arithmetic decoding technique, but is not limited thereto.

In operation 840, the method may include estimating a probability distribution of the first latent representation. For example, the image encoding apparatus may estimate a probability distribution of the first latent representation by using the non-invertible neural network-based module. For example, entropy decoding may be performed on the bitstream generated in operation 830, and a hyperprior, output by the hyperprior decoder by using as an input the second latent representation reconstructed by entropy decoding, may be used as a probability distribution. In another example, a hyperprior output by the hyperprior decoder is input to the context estimator, and the context estimator may estimate a probability distribution of the first latent representation by using the hyperprior. According to an embodiment, the probability distribution may be estimated by applying various probability models including a Gaussian-based model. In the case where the context estimator divides the first latent representation into a plurality of sub-blocks and estimates the probability distribution for each sub-block, the probability distribution of the first latent representation may be estimated for a next sub-block by using a result of entropy decoding of the bitstream generated in operation 850 for a previous sub-block.

In operation 840, the method may include performing entropy encoding on the first latent representation. For example, by using the entropy encoder, the image encoding apparatus may perform entropy encoding on the first latent representation based on the probability distribution estimated in operation 840. A bitstream of the first latent representation may be output as a result of the entropy encoding. According to an embodiment, the bitstream of a sub-block, which is generated as a result of the entropy encoding, may be entropy decoded for use in estimating a probability distribution for a next sub-block.

Figure 9:
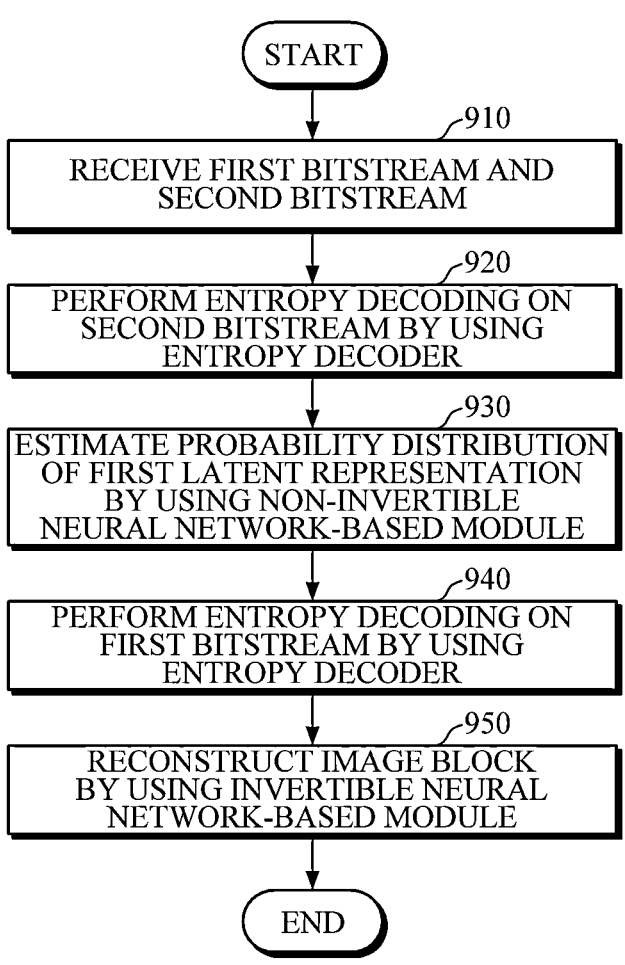
FIG. 9 is a flowchart illustrating an image decoding method according to an embodiment of the disclosure.

FIG. 9 is a flowchart illustrating an image decoding method according to an embodiment of the disclosure.

The method of FIG. 9 is an example of an image decoding method performed by the image decoding apparatuses 600 and 700 of FIG. 6 or FIG. 7, which will be briefly described below in order to avoid redundancy.

According to an embodiment, in operation 910, the method may include receiving a first bitstream and a second bitstream. For example, the image decoding apparatus receives a first bitstream and a second bitstream.

In operation 920, the method may include performing entropy decoding on the second bitstream. For example, the image decoding apparatus may perform entropy decoding on the second bitstream by using the entropy decoder in 920. The entropy decoder may reconstruct a second latent representation by entropy decoding the second bitstream based on a probability distribution predetermined by training.

In operation 930, the method may include estimating a probability distribution of a first latent representation based on the second latent representation. For example, the image decoding apparatus may estimate a probability distribution of a first latent representation by using the second latent representation, reconstructed in operation 920, as an input and using a non-invertible neural network-based module. The non-invertible neural network-based module may include the hyperprior decoder and/or the context estimator. The second latent representation reconstructed in operation 920 may be input to the hyperprior decoder to output a hyperprior, and the hyperprior may be used as the probability distribution of the first latent representation, or the hyperprior may be input to the context estimator to estimate the probability distribution.

In operation 940, the method may include performing entropy decoding on the first bitstream based on the probability distribution. For example, by using the entropy decoder, the image decoding apparatus may perform entropy decoding on the first bitstream by using the probability distribution estimated in operation 930 as an input.

In operation 950, the method may include reconstructing the reconstructed first latent representation into an image block. For example, by using an invertible neural network-based module, the image decoding apparatus may reconstruct the reconstructed first latent representation into an image block. In the image encoding process, in an example case in which the image block is divided into sub-blocks and image encoding is performed in units of sub-blocks, the reconstructed first latent representations in units of sub-blocks may be merged.

Figure 10:
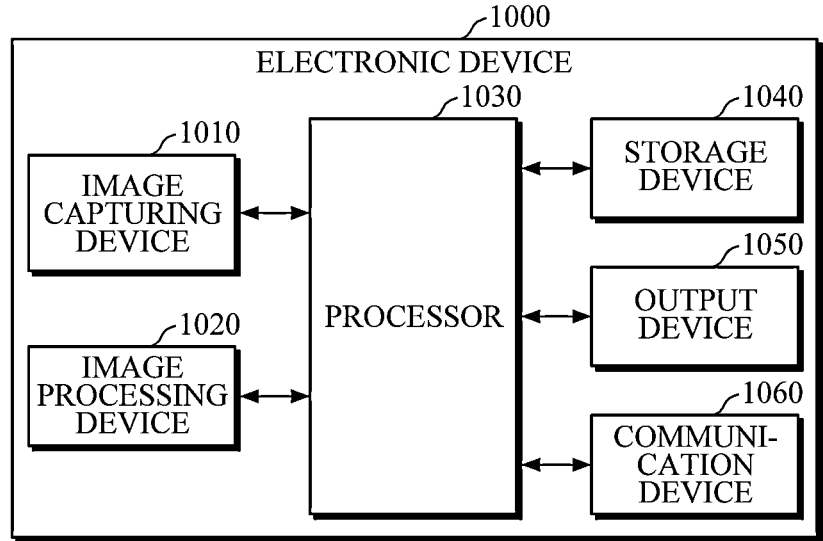
FIG. 10 is a block diagram illustrating an electronic device according to an embodiment of the disclosure.

FIG. 10 is a block diagram illustrating an electronic device according to an embodiment of the disclosure.

The electronic device may include, for example, various image transmission/reception devices, such as TV, monitors, Internet of Things (IoT) devices, radar devices, smart phones, wearable devices, tablet PCs, netbooks, laptops, desktop computers, head mounted displays (HMDs), autonomous vehicles, Virtual Reality (VR) devices, Augmented Reality (AR) devices, eXtended Reality (XR) devices, automobiles, mobile robots, etc., as well as cloud computing devices, and the like.

Referring to FIG. 10, an electrode device 1000 may include an image capturing device 1010, an image processing device 1020, a processor 1030, a storage device 1040, an output device 1050, and a communication device 1060.

The image capturing device 1010 may include a device, such as a camera and the like, for capturing still images or moving images, etc., and may store the captured images in the storage device 104 and transmit the images to the processor 1030. The image capturing device 1010 may include a lens assembly having one more lenses, image sensors, image signal processors, and/or flashes. The lens assembly included in a camera module may collect light emanating from a subject to be imaged.

The image processing device 1020 may include the image encoding apparatus and/or the image decoding apparatus described above. The image processing device 1020 may encode and/or decode an image with high efficiency based on Frame Buffer Compression (FBC) technology as described above, thereby reducing DRAM bandwidth or power consumption required for data communication between IP and DRAM in the SoC of the electronic device or data communication between electronic devices. In addition, by performing high-efficiency image encoding, power consumption may be further reduced, and the battery time or thermal limits of an electronic device may be improved.

The processor 1030 may include a main processor, e.g., one or more central processing units (CPU) or application processors (AP), etc., an intellectual property (IP) core, and an auxiliary processor, e.g., a graphics processing unit (GPU), an image signal processor (ISP), a sensor hub processor, or a communication processor (CP), which is operable independently from, or in conjunction with, the main processor, and the like. The processor 1030 may control components of the electronic device 1000 and process requests thereof.

The storage device 1040 may store data (e.g., images (still images or moving images captured by an image capturing device), data processed by the processor 1030, a neural network used by the image processing device 1020, etc.) which are required for operation of the components of the electronic device 1000, and instructions for executing functions. The storage device 1040 may include a computer-readable storage medium, e.g., Random Access Memories (RAM), Dynamic Random Access Memories (DRAM), Static Random Access Memories (SRAM), magnetic hard disk, optical disk, flash memory, Electrically Programmable Read Only Memories (EPROM), or other types of computer-readable storage media known in this art.

The output device 1050 may visually/non-visually output the images captured by the image capturing device 1010, and/or data processed by the processor 1030. The output device 1050 may include a sound output device, a display device (e.g., display), an audio module, and/or a haptic module. The images and the like processed by the image processing device 1020 may be displayed on a display to improve user experience in images.

The communication device 1060 may support establishment of a direct (e.g., wired) communication channel and/or a wireless communication channel between the electronic device 1000 and other electronic device, a server, or the sensor device within a network environment, and performing of communication via the established communication channel, by using various communication techniques. The communication device 1060 may transmit the images captured by the image capturing device 1010, bitstreams output by the image processing device 1020 in an image encoding process, images decoded in an image decoding process, and/or the data processed by the processor 1030, etc., to another electronic device. In addition, the communication device 1060 may receive images to be processed from a cloud device or another electronic device, and may store the received images in the storage device 1040.

In addition, the electronic device 1000 may further include a sensor device (e.g., acceleration sensor, gyroscope, magnetic field sensor, proximity sensor, illuminance sensor, fingerprint sensor, etc.) for detecting various data, an input device (e.g., a microphone, a mouse, a keyboard, and/or a digital pen (e.g., a stylus pen, etc.), etc.) for receiving instructions and/or data from a user and the like.

Figure 11:
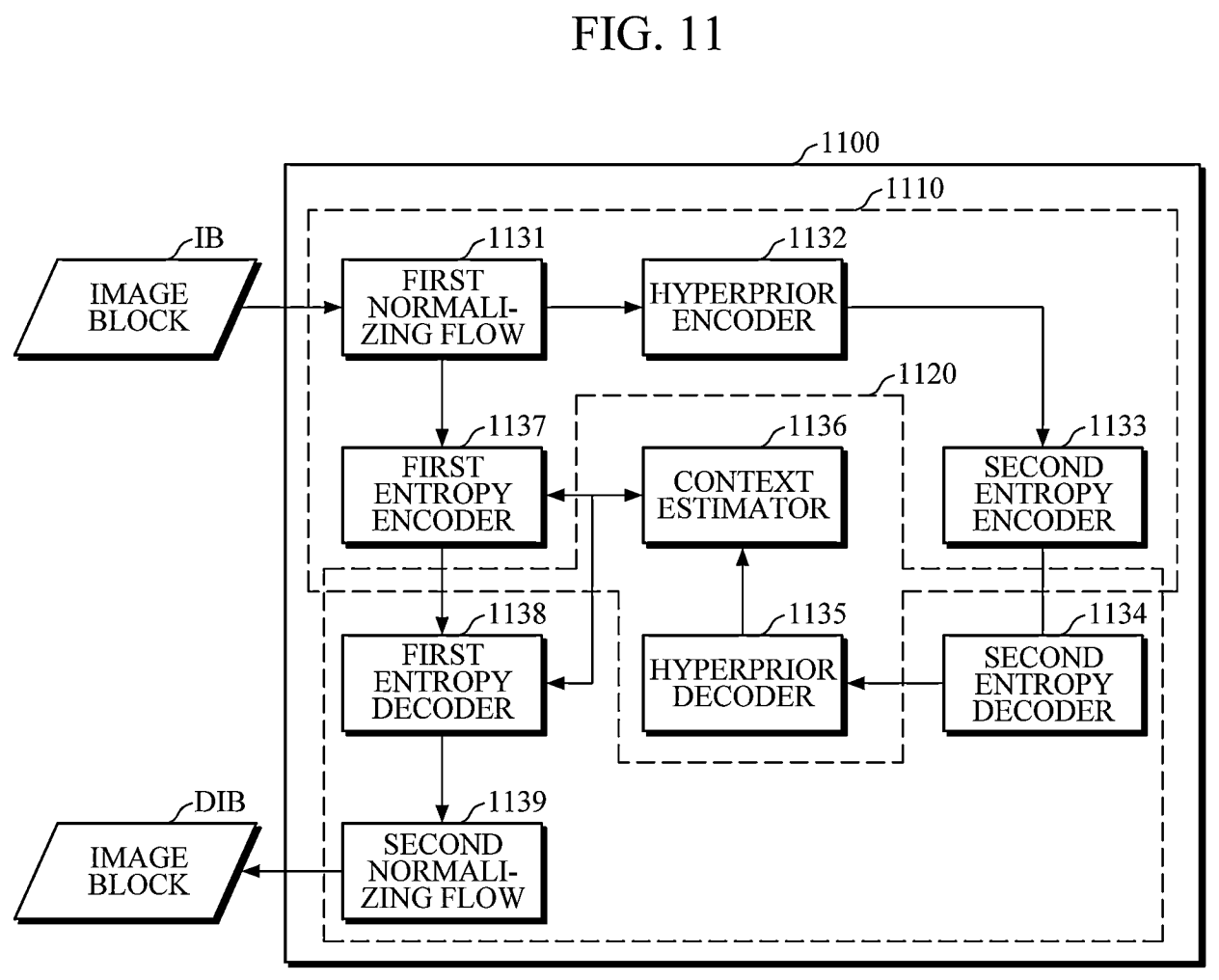

FIG. 11 is a block diagram illustrating an example of a process of encoding and decoding an image performed by an image processing device included in an electronic device.

Referring to FIG. 11, an example of the process of encoding and decoding an image, which is performed by an image encoding device 1110 and an image decoding device 1120 of an image processing device 1100, will be described below.

In the image encoding process, an image block IB to be encoded is input to a first normalizing-flow neural network 1131 to be transformed into a latent representation. The transformed latent representation is input to a hyperprior encoder 1132 to be transformed into a hyperprior latent representation. The hyperprior latent representation is input to a second entropy encoder 1133 so as to output a bitstream of the hyperprior latent representation.

The bitstream of the hyperprior latent representation is input to a second entropy decoder 1134 to be reconstructed into a hyperprior latent representation. The second entropy encoder 1133 and/or the second entropy decoder 1134 may perform entropy encoding and/or decoding based on a probability distribution generated in advance through training. The reconstructed hyperprior latent representation is input to the hyperprior decoder 1135 such that a hyperprior is output by the hyperprior decoder 1135, and the hyperprior is input to a context estimator 1136 so as to output a probability distribution. The output probability distribution may be input to a first entropy encoder 1137 and/or a first entropy decoder 1138. In addition, the latent representation, transformed by the first normalizing-flow neural network 1131, is input to the first entropy encoder 1137 and entropy-encoded, so as to output a bitstream of the latent representation. The output bitstream is entropy-decoded by the first entropy decoder 1138 to be reconstructed into a latent representation, and is input to the context estimator 1136 for use in estimating a probability distribution of a subsequent latent representation. Two bitstreams are output by performing image encoding.

In the image decoding process, the image block is reconstructed by using, as input, the two bitstreams output in the image encoding process. The bitstreams output by the second entropy encoder 1133 are input to the second entropy decoder 1134 and entropy-decoded to be reconstructed into a hyperprior latent representation. The reconstructed hyperprior latent representation is input to the hyperprior decoder 1135 so as to output a hyperprior, and the output hyperprior is input to the context estimator 1136 so as to estimate a probability distribution. The probability distribution estimated by the context estimator 1136 and the bitstream output by the first entropy encoder 1137 in the image encoding process are input to the first entropy decoder 1138 and entropy-decoded by the first entropy decoder 1138 to be reconstructed into a latent representation. The reconstructed latent representation is input to a second normalizing-flow neural network 1139 to be reconstructed into an image block DIB.

The disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily inferred by programmers of ordinary skill in the art to which the invention pertains.

The disclosure has been described herein with regard to preferred embodiments. However, it will be obvious to those skilled in the art that various changes and modifications can be made without changing technical conception and essential features of the disclosure. Thus, it is clear that the above-described embodiments are illustrative in all aspects and are not intended to limit the disclosure.

What is claimed is:

1. An image encoding method comprising:

transforming an image block into a first latent representation based on an invertible neural network;

transforming, by a hyperprior encoder, the first latent representation into a second latent representation in units of sub-blocks based on a non-invertible neural network;

estimating a first probability distribution of the first latent representation based on the second latent representation;

performing entropy encoding on the first latent representation based on the first probability distribution by using a first entropy encoder; and performing entropy encoding on the second latent representation based on a second probability distribution by using a second entropy encoder, wherein the estimating of the first probability distribution comprises:

entropy decoding of the second latent representation by using a hyperprior decoder, obtaining a hyperprior based on a result of the entropy decoding of the second latent representation; and estimating the first probability distribution of the first latent representation based on the hyperprior by using a context estimator.

2. The method of claim 1, wherein the invertible neural network comprises a normalizing-flow neural network comprising one or more coupling layers.

3. The method of claim 2, wherein a parameter of the one or more coupling layers are obtained through training based on at least one of a neural network structure or data distribution.

4. The method of claim 1, wherein the estimating of the first probability distribution comprises:

dividing the first latent representation into a plurality of groups, and estimating the first probability distribution for each of the plurality of groups.

5. The method of claim 1, wherein the estimating of the first probability distribution comprises obtaining a hyperprior as a probability distribution of the first latent representation by using a hyperprior decoder.

6. The method of claim 1, further comprising:

dividing the image block into a plurality of sub-blocks.

7. The method of claim 6, further comprising:

performing an operation within each of the plurality of sub-blocks based on one or more coupling layers of a normalizing-flow neural network.

8. The method of claim 6, further comprising:

performing an operation between the plurality of sub-blocks based on one or more coupling layers of a normalizing-flow neural network.

9. The method of claim 8, wherein the operation between the plurality of sub-blocks is performed by at least one of a hyperprior encoder, a hyperprior decoder, or a context estimator.

10. The method of claim 1, wherein the transforming of the image block into the first latent representation comprises transforming the image block into the first latent representation by hierarchically using two or more first modules.

11. The method of claim 10, wherein the transforming of the image block into the first latent representation comprises inputting a portion of a third latent representation, which is transformed by a first module of a previous layer, to a first module of a next layer to transform the portion of the third latent representation into a fourth latent representation, and combining a remaining portion of the third latent representation with the fourth latent representation to transform the combined latent representation into the first latent representation.

12. An image decoding method comprising:

receiving a first bitstream of a first latent representation, obtained by transforming an image block based on an invertible neural network;

receiving a second bitstream of a second latent representation obtained by transforming, by a hyperprior encoder, the first latent representation in units of sub-blocks based on a non-invertible neural network;

estimating a first probability distribution of the first latent representation based on the second bitstream; and reconstructing the image block based on the first bitstream and the first probability distribution, wherein the estimating of the first probability distribution comprises:

entropy decoding of the second latent representation by using a hyperprior decoder, obtaining a hyperprior based on a result of the entropy decoding of the second latent representation; and estimating the first probability distribution of the first latent representation based on the hyperprior by using a context estimator.

13. The method of claim 12, further comprising:

entropy decoding the first bitstream based on the first probability distribution of the first latent representation by using a first entropy decoder, wherein the reconstructing of the image block comprises reconstructing the image block based on a result of the entropy decoding of the first bitstream and the first probability distribution.

14. The method of claim 12, further comprising:

entropy decoding the second bitstream based on a second probability distribution by using a second entropy decoder.

15. The method of claim 14, wherein the estimating of the first probability distribution of the first latent representation comprises obtaining a hyperprior based on a result of decoding of the second bitstream, and estimating the first probability distribution of the first latent representation based on the hyperprior.

16. An electronic device comprising:

a memory storing one or more instructions, and a processor configured to execute the one or more instructions to implement:

an invertible neural network configured to transform an image block into a first latent representation;

a non-invertible neural network configured to:

transform, by a hyperprior encoder, the first latent representation into a second latent representation in units of sub-blocks, and estimate a first probability distribution of the first latent representation based on the second latent representation; and an entropy encoder configured to:

perform entropy encoding on the first latent representation based on the first probability distribution, and perform entropy encoding on the second latent representation based on a second probability distribution by using a second entropy encoder, wherein the estimating of the first probability distribution comprises:

entropy decoding of the second latent representation by using a hyperprior decoder, obtaining a hyperprior based on a result of the entropy decoding of the second latent representation; and estimating the first probability distribution of the first latent representation based on the hyperprior by using a context estimator.

17. An electronic device comprising:

a memory storing one or more instructions, and a processor configured to execute the one or more instructions to implement:

a non-invertible neural network configured to:

receive first bitstream of a first latent representation obtained by transforming an image block, and a second bitstream of a second latent representation obtained by transforming, by hyperprior encoder, the first latent representation in units of sub-blocks, and estimate a probability distribution of the first latent representation; and an invertible neural network configured to reconstruct an image based on the first bitstream and the estimated probability distribution, wherein the estimating of the first probability distribution comprises:

entropy decoding of the second latent representation by using a hyperprior decoder, obtaining a hyperprior based on a result of the entropy decoding of the second latent representation; and estimating the first probability distribution of the first latent representation based on the hyperprior by using a context estimator.

* * * * *